(12) United States Patent
Nair

(10) Patent No.: US 10,805,792 B2
(45) Date of Patent: Oct. 13, 2020

(54) METHOD AND APPARATUS FOR SECURING MULTIPLE NAS CONNECTIONS OVER 3GPP AND NON-3GPP ACCESS IN 5G

(71) Applicant: Nokia Technologies Oy, Espoo (FI)

(72) Inventor: Suresh Nair, Whippany, NJ (US)

(73) Assignee: Nokia Technologies Oy, Espoo (FI)

(*) Notice: Subject to any disclaimer, the term of this patent is extended or adjusted under 35 U.S.C. 154(b) by 46 days.

(21) Appl. No.: 16/124,631

(22) Filed: Sep. 7, 2018

(65) Prior Publication Data

US 2020/0162898 A1 May 21, 2020

(51) Int. Cl.
| | |
|---|---|
| *H04W 4/00* | (2018.01) |
| *H04W 12/00* | (2009.01) |
| *H04W 12/04* | (2009.01) |
| *H04W 60/06* | (2009.01) |
| *H04W 12/08* | (2009.01) |
| *H04W 12/10* | (2009.01) |

(52) U.S. Cl.
CPC ... *H04W 12/0017* (2019.01); *H04W 12/0401* (2019.01); *H04W 12/0802* (2019.01); *H04W 12/1006* (2019.01); *H04W 60/06* (2013.01)

(58) Field of Classification Search
None
See application file for complete search history.

(56) References Cited

U.S. PATENT DOCUMENTS

| | | | | |
|---|---|---|---|---|
| 2009/0111428 A1* | 4/2009 | Blommaert | ........... | H04W 12/04 455/411 |
| 2011/0072488 A1* | 3/2011 | Bi | ........... | H04L 63/108 726/1 |
| 2018/0376444 A1* | 12/2018 | Kim | ........... | H04W 4/70 |
| 2019/0037407 A1* | 1/2019 | Nair | ........... | H04W 60/00 |
| 2019/0037454 A1* | 1/2019 | Lee | ........... | H04W 36/0072 |
| 2019/0335330 A1* | 10/2019 | Salkintzis | ........ | H04W 12/00514 |
| 2019/0357129 A1* | 11/2019 | Park | ........... | H04W 88/14 |
| 2019/0373461 A1* | 12/2019 | Ito | ........... | H04W 8/02 |
| 2019/0387407 A1* | 12/2019 | Jost | ........... | H04W 12/001 |
| 2019/0387440 A1* | 12/2019 | Yiu | ........... | H04W 36/165 |
| 2019/0394792 A1* | 12/2019 | Jeon | ........... | H04L 5/0092 |
| 2020/0015311 A1* | 1/2020 | Kim | ........... | H04W 28/04 |

* cited by examiner

*Primary Examiner* — Bob A Phunkulh
(74) *Attorney, Agent, or Firm* — Alston & Bird LLP

(57) ABSTRACT

A method, apparatus and computer program product may be provided for securing multiple NAS connections over a plurality of access types. An exemplary method may comprise receiving, at an access mobility function (AMF), a first registration request from user equipment (UE) over a first access type, establishing a main NAS context comprising at least a key set identifier for identifying a key for the AMF ($K_{AMF}$), NAS integrity and encryption keys and a selected algorithm for all NAS links, wherein establishing the main NAS context comprises establishing the KAMF, and subsequently deriving, from the KAMF, the NAS integrity and NAS encryption keys and establishing a first NAS sub-context corresponding to a first access type, the first NAS sub-context comprising at least a first NAS link identification number, a first uplink packet count, a first downlink packet count.

38 Claims, 4 Drawing Sheets

400

100

200

| Main Context $K_{AMF}$, $K_{NAS\ enc}$, $K_{NASint}$, NAS Algorithm | | |
|---|---|---|
| NAS Subcontext 1 NAS link id#1 NAS UL COUNT NAS DL COUNT | NAS Subcontext 2 NAS link id#2 NAS UL COUNT NAS DL COUNT | NAS Subcontext 3 NAS link id#3 NAS UL COUNT NAS DL COUNT |

METHOD AND APPARATUS FOR SECURING MULTIPLE NAS CONNECTIONS OVER 3GPP AND NON-3GPP ACCESS IN 5G

TECHNICAL FIELD

An example embodiment relates generally to a method and apparatus for providing 5G network access simultaneously via more than one access type, and more particularly, for providing simultaneous NAS link security when there are simultaneous 3GPP and untrusted non-3GPP access connections.

BACKGROUND

In $5^{th}$ generation wireless systems (5G), user equipment (UE) may access a 5G network via one or more access types. A previous specification, for example, as captured in technical specification (TS) 23.501, describes a 5G UE connecting to a 5G network simultaneously over 3GPP access and non-3GPP. However, current specifications do not provide solutions for ensuring security, such as integrity protection and ciphering, of multiple non-access stratum (NAS) links. In particular, solutions are necessary for determining whether or not to use same keys or different keys for the protection, if different keys are used, how and when to derive the keys. Solutions are also necessary regarding how to instantiate the multiple NAS contexts and how to ensure the security separation between the multiple links.

BRIEF SUMMARY

A method, apparatus and computer program product are disclosed for facilitating establishment of a NAS sub-context when UE registers over multiple access types such as 3GPP, untrusted non-3GPP or other types of access, for the corresponding access type. A main NAS context may be created at the time of registration of the first access type and may contain the NAS integrity and encryption keys and a selected algorithm for all NAS links. This main NAS context may then exist as long as at least one NAS sub-context exists between the UE and the AMF.

In some embodiments, a method of securing multiple non-access stratum (NAS) connections over a plurality of access types may be provided, the method comprising receiving, at an access mobility function (AMF), a first registration request from user equipment (UE) over a first access type, establishing a main NAS context comprising at least a key set identifier for identifying a key for the AMF ($K_{AMF}$), NAS integrity and encryption keys and a selected algorithm for all NAS links, and establishing a first NAS sub-context corresponding to a first access type, the first NAS sub-context comprising at least a first NAS link identification number, a first uplink (UL) packet count, a first downlink (DL) packet count.

In some embodiments, establishing the main NAS context comprises establishing the $K_{AMF}$, and subsequently deriving, from the $K_{AMF}$, the NAS integrity and NAS encryption keys. In some embodiments, the method may further comprise receiving a subsequent registration request from the UE over a second access type, establishing a second NAS sub-context, the second NAS sub-context comprising at least a second NAS link identification number, a second UL packet count, a second DL packet count, wherein the second NAS sub-context is secured using the NAS integrity and encryption keys and the selected algorithm from the main NAS context.

In some embodiments, the main NAS context is established only for the first registration request. In some embodiments, the method may further comprise deactivating the first NAS sub-context upon UE deregistration from the first access type, wherein the main NAS context remains in effect upon deactivation of the first NAS sub-context. In some embodiments, the method may further comprise deactivating the second NAS sub-context upon UE deregistration from the second access type, wherein the main NAS context remains in effect upon deactivation of the second NAS sub-context.

In some embodiments, the method may further comprise deactivating the second NAS sub-context upon UE deregistration from the second access type, wherein the main NAS context remains in effect upon deactivation of the second NAS sub-context, subsequent to the deactivation of the second NAS sub-context from the second access type, deactivating the first NAS sub-context upon UE deregistration from the first access type, determining that the UE has deregistered from a last access type, and deactivating the main NAS context. In some embodiments, the method may further comprise in an instance in which deregistration occurs over a particular access type, deactivating each sub-context upon UE deregistration from the particular access type, and deactivating the main NAS context.

In some embodiments, the first access type is at least one of 3GPP access or non-3GPP access, and wherein the second access type is at least one of 3GPP access or non-3GPP access, and wherein the first access type and the second access type are different. In some embodiments, corresponding UL packet count and DL pack count and the access type identifier are maintained independently.

In some embodiments, a computer program product for securing multiple non-access stratum (NAS) connections over a plurality of access types may be provided, the computer program product comprising at least one non-transitory computer-readable storage medium having computer-executable program code instructions stored therein, the computer-executable program code instructions comprising program code instructions for receiving, at an access mobility function (AMF), a first registration request from user equipment (UE) over a first access type, establishing a main NAS context comprising at least a key set identifier for identifying a key for the AMF ($K_{AMF}$), NAS integrity and encryption keys and a selected algorithm for all NAS links, and establishing a first NAS sub-context corresponding to a first access type, the first NAS sub-context comprising at least a first NAS link identification number, a first UL packet count, a first DL packet count.

In some embodiments, the computer-executable program code instructions for establishing the main NAS context further comprise program code instructions for establishing the $K_{AMF}$, subsequently deriving, from the $K_{AMF}$, the NAS integrity and NAS encryption keys. In some embodiments, the computer-executable program code instructions further comprise program code instructions for receiving a subsequent registration request from the UE over a second access type, establishing a second NAS sub-context, the second NAS sub-context comprising at least a second NAS link identification number, a second UL packet count, a second DL packet count, wherein the second NAS sub-context is secured using the NAS integrity and encryption keys and the selected algorithm from the main NAS context.

In some embodiments, the main NAS context is established only for the first registration request. In some embodiments, the computer-executable program code instructions further comprise program code instructions for deactivating the first NAS sub-context upon UE deregistration from the first access type, wherein the main NAS context remains in effect upon deactivation of the first NAS sub-context. In some embodiments, the computer-executable program code instructions further comprise program code instructions for deactivating the second NAS sub-context upon UE deregistration from the second access type, wherein the main NAS context remains in effect upon deactivation of the second NAS sub-context.

In some embodiments, the computer-executable program code instructions further comprise program code instructions for deactivating the second NAS sub-context upon UE deregistration from the second access type, wherein the main NAS context remains in effect upon deactivation of the second NAS sub-context, subsequent to the deactivation of the second NAS sub-context from the second access type, deactivating the first NAS sub-context upon UE deregistration from the first access type, determining that the UE has deregistered from a last access type, and deactivating the main NAS context.

In some embodiments, the computer-executable program code instructions further comprise program code instructions for in an instance in which deregistration occurs over a particular access type, deactivating each sub-context upon UE deregistration from the particular access type, and deactivating the main NAS context.

In some embodiments, the first access type is at least one of 3GPP access or non-3GPP access, and wherein the second access type is at least one of 3GPP access or non-3GPP access, and wherein the first access type and the second access type are different. In some embodiments, corresponding UL packet count and DL pack count and the access type identifier are maintained independently.

In some embodiments, an apparatus for securing multiple non-access stratum (NAS) connections over a plurality of access types may be provided, the apparatus comprising at least one processor and at least one memory including computer program code, the at least one memory and the computer program code configured to, with the processor, cause the apparatus to at least receive, at an access mobility function (AMF), a first registration request from user equipment (UE) over a first access type, establish a main NAS context comprising at least a key set identifier for identifying a key for the AMF ($K_{AMF}$), NAS integrity and encryption keys and a selected algorithm for all NAS links, and establish a first NAS sub-context corresponding to a first access type, the first NAS sub-context comprising at least a first NAS link identification number, a first UL packet count, a first DL packet count.

In some embodiments, the computer program code configured to cause establishment of the main NAS context further comprises program code further configured to, with the processor, cause the apparatus to establish the $K_{AMF}$, subsequently derive, from the $K_{AMF}$, the NAS integrity and NAS encryption keys. In some embodiments, the at least one memory and the computer program code are further configured to, with the processor, cause the apparatus to receive a subsequent registration request from the UE over a second access type, establish a second NAS sub-context, the second NAS sub-context comprising at least a second NAS link identification number, a second UL packet count, a second DL packet count, wherein the second NAS sub-context is secured using the NAS integrity and encryption keys and the selected algorithm from the main NAS context.

In some embodiments, the main NAS context is established only for the first registration request. In some embodiments, the at least one memory and the computer program code are further configured to, with the processor, cause the apparatus to deactivate the first NAS sub-context upon UE deregistration from the first access type, wherein the main NAS context remains in effect upon deactivation of the first NAS sub-context. In some embodiments, the computer-executable program code instructions further comprise program code instructions for deactivate the second NAS sub-context upon UE deregistration from the second access type, wherein the main NAS context remains in effect upon deactivation of the second NAS sub-context.

In some embodiments, the at least one memory and the computer program code are further configured to, with the processor, cause the apparatus to deactivate the second NAS sub-context upon UE deregistration from the second access type, wherein the main NAS context remains in effect upon deactivation of the second NAS sub-context, subsequent to the deactivation of the second NAS sub-context from the second access type, deactivate the first NAS sub-context upon UE deregistration from the first access type, determine that the UE has deregistered from a last access type, and deactivate the main NAS context.

In some embodiments, the at least one memory and the computer program code are further configured to, with the processor, cause the apparatus to in an instance in which deregistration occurs over a particular access type, deactivate each sub-context upon UE deregistration from the particular access type, and deactivate the main NAS context.

In some embodiments, the first access type is at least one of 3GPP access or non-3GPP access, and wherein the second access type is at least one of 3GPP access or non-3GPP access, and wherein the first access type and the second access type are different. In some embodiments, corresponding UL packet count and DL pack count and the access type identifier are maintained independently.

BRIEF DESCRIPTION OF THE DRAWINGS

Figure 1:
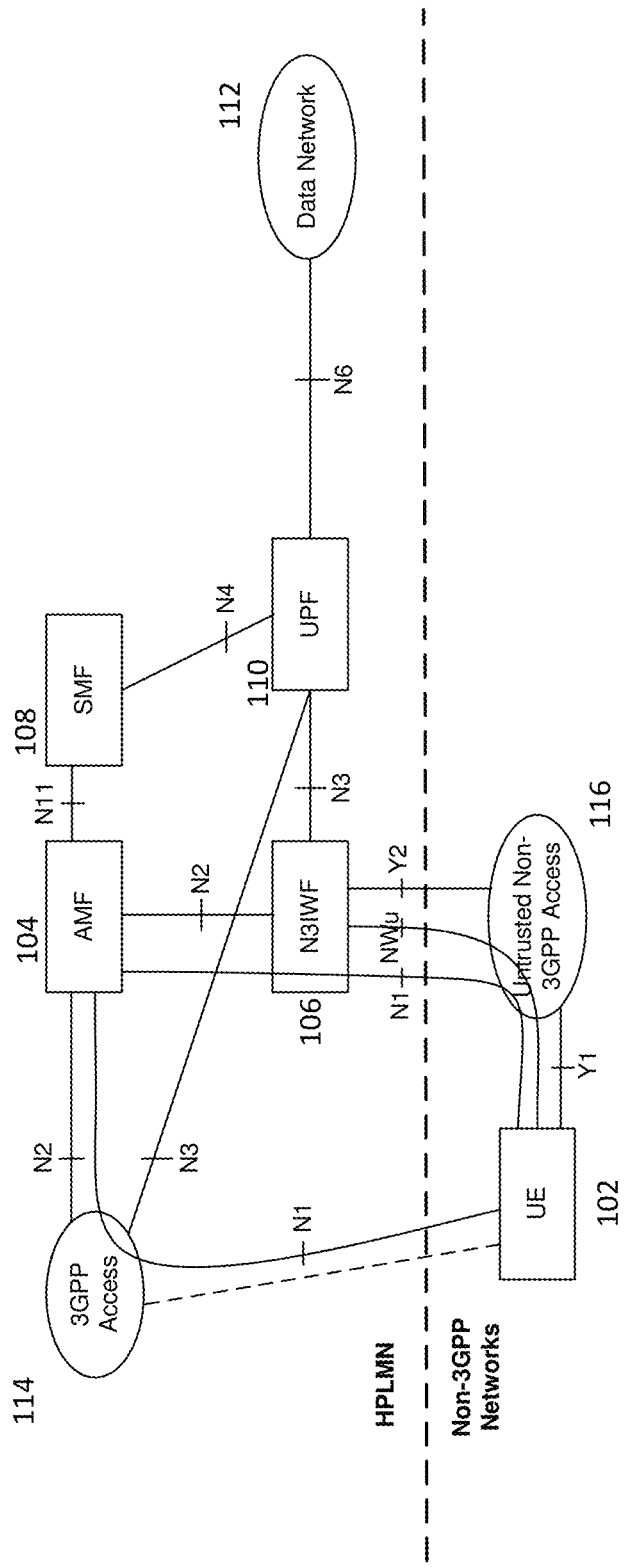
Figure 2:
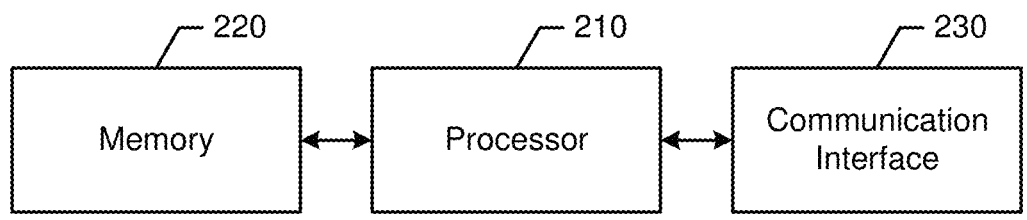
Figure 3:
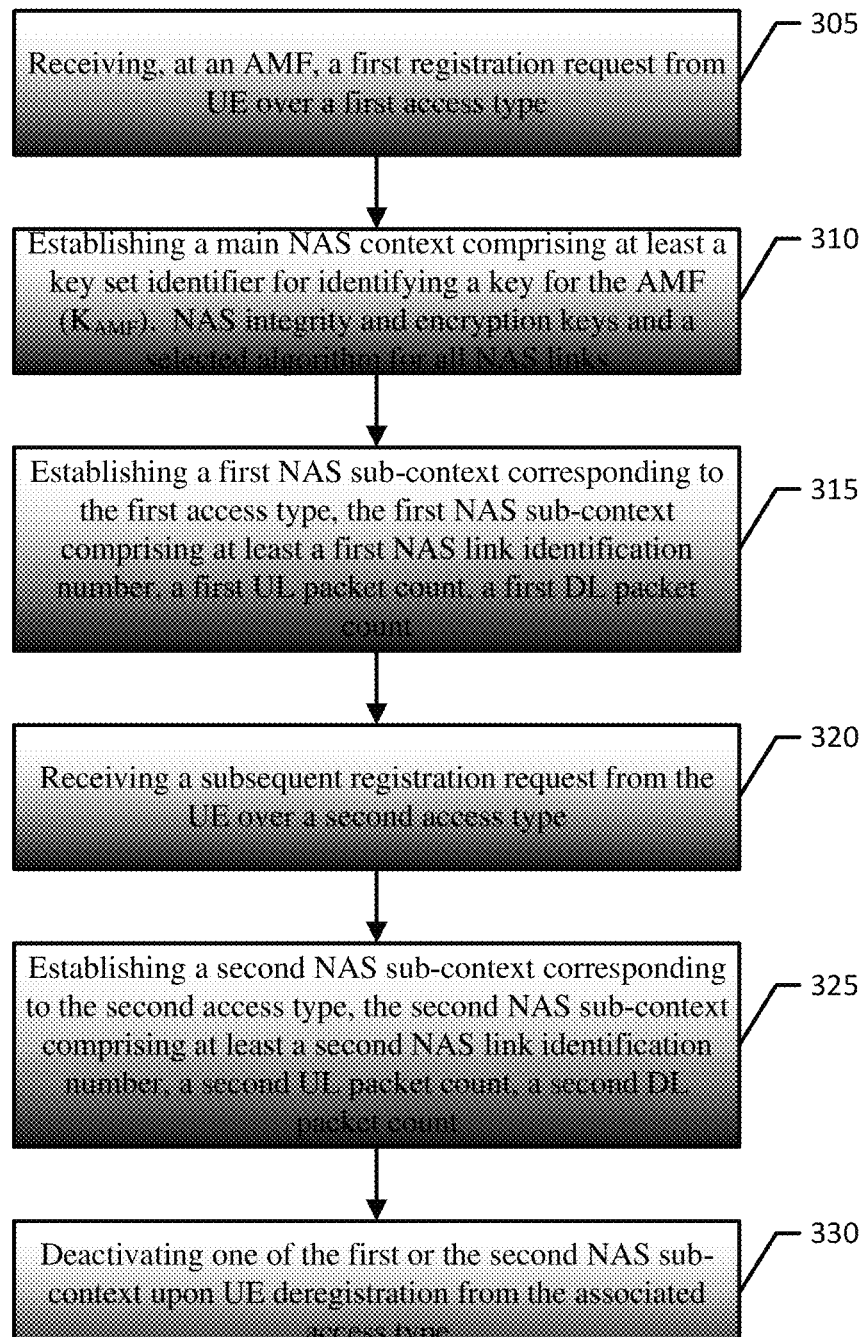

Having thus described certain example embodiments of the present disclosure in general terms, reference will hereinafter be made to the accompanying drawings, which are not necessarily drawn to scale, and wherein:

FIG. 1 shows a block diagrams of a system that may be specifically configured, in accordance with an example embodiment of the present disclosure;

FIG. 2 is a block diagram of an apparatus that may be specifically configured in accordance with an example embodiment of the present disclosure;

FIG. 3 shows a flowchart depicting operations performed, such as by the apparatus of FIG. 2, in accordance with an example embodiment of the present disclosure; and FIG. 4 shows a block diagram illustrating an exemplary embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product may be provided in order to secure multiple NAS connections over a plurality of access types.

FIG. 1 shows the principles of the 5G architecture in the current draft 3GPP specifications. In particular, FIG. 1, is a networked system 100 in accordance with an example embodiment of the present disclosure, specifically showing a 5G User Equipment (UE) connected to 5G network simultaneously over 3GPP access 114 and non-3GPP access 116. Currently, only the support of non-3GPP access 116 networks deployed outside the NG-RAN is allowed. Currently, 5G Core Network only supports untrusted non-3GPP accesses. Non-3GPP access networks shall be connected to the 5G Core Network via a Non-3GPP Inter-Working Function (N3IWF) 106. The N3IWF interfaces the 5G Core Network Access Management Function (AMF) 104 and user plane functions (UPF) 110 via N2 and N3 interfaces, respectively. The N2 and N3 reference points are used to connect standalone non-3GPP accesses to 5G Core Network CPF and UPF, respectively. A UE 102 that accesses the 5G Core Network over a standalone non-3GPP access shall, after UE attachment, support NAS signaling with 5G Core Network control-plane functions using the N1 reference point. When a UE 102 is connected via a NG-RAN and via a standalone non-3GPP access, multiple N1 instances shall exist for the UE. A UE 102 simultaneously connected to the same 5G Core Network of a public land mobile network (PLMN) over a 3GPP access 114 and a non-3GPP access 116 shall be served by a single AMF 104 if the selected N3IWF 106 is located in the same PLMN as the 3GPP access 114.

Regardless of the type of device that embodies the UE 102 or any of the network devices including, but not limited to AMF 104, N3IWF 106, SMF 108, UPF 110, or any of the other devices shown, the UE 102 or any of the network devices including, but not limited to AMF 104, N3IWF 106, SMF 108, UPF 110, or any of the other devices shown may include or be associated with an apparatus 200 as shown in FIG. 2. In this regard, the apparatus may include or otherwise be in communication with a processor 210, a memory device 220, and a communication interface 230. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 210 (and/or co-processors or any other processing circuitry assisting or otherwise associated with the processor) may be in communication with the memory device 220 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 200 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102 or any of the network devices including, but not limited to AMF 104, N3IWF 106, SMF 108, UPF 110 configured to employ an example embodiment of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 210 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 220 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 230 may be any means such as a device or circuitry embodied in either hardware or a combination of hardware and software that is configured to receive and/or transmit data. In this regard, the communication interface 230 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

FIG. 3 is an example flowchart illustrating a method of operating an example apparatus, for example, apparatus 200, embodied by, for example, AMF 104, performed in accordance with an embodiment of the present invention. In particular, FIG. 3 is a flowchart depicting an exemplary embodiment for securing multiple NAS connections over a plurality of access types In an example embodiment, the apparatus 20 includes means, such as the processor 210 or the like, configured to receive, at an AMF, a first registration request from UE over a first access type. See block 305 of FIG. 3. In response the first registration request from the UE, the NAS Security Mode Command (SMC) message from the AMF to the UE may comprise a selected NAS algorithm, the allowed Network Slice Selection Assistance Information (NSSAI), and the 5G key set identifier (ngKSI) for identifying the key of the AMF called $K_{AMF}$ and other security context parameters. NAS integrity key $K_{NASint}$ which is used to integrity protect the NAS messages and NAS encryption key $K_{NASenc}$ which is used to encrypt the NAS messages are derived from the AMF key $K_{AMF}$. These parameters and the security context identified by the 5G key set identifier ngKSI may be used for all access types, and as such, do not need to be established for subsequent NAS sub-context creation.

That is, because future registration requests from the UE over another access type may prompt an additional NAS SMC command from the AMF, via that access type, protected using the same NAS security keys and selected algorithm, a main context may be established, eliminating the need to re-establish these parameters. In an example embodiment, the apparatus 20 includes means, such as the processor 210 or the like, configured establish a main NAS context. In some embodiments, the main NAS context may comprise at least a NAS integrity key (e.g., $K_{NASint}$), a NAS encryption key (e.g., $K_{NASenc}$), a selected algorithm, and key set identifier (e.g., ngKSI), common for all NAS links. See block 310 of FIG. 3. That is, a main NAS context may be created at the time of registration of the first access type and may contain the NAS integrity and encryption keys and a selected algorithm for all NAS links. This main NAS context may then exist as long as at least one NAS sub-context exists between the UE and the AMF. In some embodiments, not only is the main NAS context established, but a first NAS sub-context is established corresponding to the first access type. For example, the main NAS context may comprise at least a NAS integrity key, a NAS encryption key, a key set identifier, and a selected algorithm, the first NAS sub-context may comprise a first NAS link identification number, a first UL packet count, a first DL packet count. That is, the apparatus 20 includes means, such as the processor 210 or the like, configured to establish a first NAS sub-context corresponding to the first access type. In some embodiments, the NAS sub-context may comprise one or more of a first NAS link identification number, a first UL packet count, a first DL packet count. See block 315 of FIG. 3.

In an example embodiment, the apparatus 20 includes means, such as the processor 210 or the like, configured to receiving a subsequent registration request from the UE over a second access type. See block 320 of FIG. 3. As described above, an additional NAS SMC command from the AMF, via the second access type may be protected using the same $K_{AMF}$, NAS security keys and selected algorithm. And as such, the NAS main context remains and a new sub-context may be established. In an example embodiment, the apparatus 20 includes means, such as the processor 210 or the like, configured to establish a NAS sub-context corresponding to the second access type. In some embodiments, the NAS sub-context may comprise one or more of a second NAS link identification number, a second UL packet count, a second DL packet count. See block 325 of FIG. 3. That is, in some embodiments, the NAS sub-context corresponding to the second access type may differ from the main NAS context, for example, with parameters specific to the NAS link, such as a NAS link identification number, an UL packet count, a DL packet count, or the like.

FIG. 4 shows a block diagram illustrating a main NAS context and three NAS sub-contexts (e.g., sub-context 1, sub-context 2, and sub-context 3). As shown, main NAS context comprises at least a NAS integrity key, a NAS encryption key, and a selected algorithm while each of the NAS sub-contexts comprise a corresponding NAS link identification number, a corresponding UL packet count, a corresponding DL packet count. Of not, for each sub-context, UL/DL counts may be independently maintained by the UE and AMF.

In some embodiments, it a NAS sub-context may be deactivated. For example, in the event that the UE de-registers from an associated access type. In an example embodiment, the apparatus 20 includes means, such as the processor 210 or the like, configured to deactivate an associated NAS sub-context in the event that the UE de-registers from the associated access type. See block 330 of FIG. 3. For example, in the event that the UE de-registers from the first access type, the apparatus may be configured to deactivate the first NAS sub-context. Alternatively, if the UE de-registers from the second access type, the apparatus may be configured to deactivate the second NAS sub-context. In any event, the main NAS context will remain in effect upon deactivation of either the first NAS sub-context or the second NAS sub-context. In some embodiments, deactivation of the main NAS context occurs only after a determination is made that the UE has deregistered from each of, including the last access type, to which it was registered. In some embodiments, deactivation of the main NAS context may occur upon de-registration from a particular access type. For example, de-registration from one particular access type (e.g., 3GPP or the like), may result in deactivation of the main NAS context as well as any remaining sub-contexts.

In some embodiments, the AMF may provide an indication to the UE in the NAS SMC message, which parameters are necessary for context separation between access types (i.e., NAS link ID number, UL and DL packet counts, etc.).

Corresponding to each access type, a NAS link is possible, and there can be a NAS sub-context. To accommodate each of and any of multiple access types, including any wired or wireless connection, including 3GPP or non3GPP, direct access, other access based on different technologies (e.g., satellite link), or the like, a link ID is needed. In the keystream generation, the NAS Link ID number may be similar to Bearer ID in the AS context. Re-using the Bearer field for the NAS Link ID may keep the input to security similar for NAS and AS. While in the AS, bearer ID must be 5 bits long, here the NAS link ID may be shorter, for example, three bits.

As described above, FIG. 3 is a flowchart depicting the operations that may be performed by an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of securing multiple non-access stratum (NAS) connections over a plurality of access types, the method comprising:
receiving, at an access mobility function (AMF), a first registration request from user equipment (UE) over a first access type;
establishing a main NAS context, between the UE and the AMF, comprising at least a key set identifier for identifying a key for the AMF ($K_{AMF}$), NAS integrity key ($K_{NASint}$) which is used to integrity protect NAS messages, and encryption key ($K_{NASenc}$) which is used to encrypt the NAS messages and a selected algorithm for all NAS links; and establishing a first NAS sub-context corresponding to a-the first access type, the first NAS sub-context comprising at least a first NAS link identification number, a first uplink (UL) packet count, and a first downlink (DL) packet count, wherein the main NAS context exists as long as at least one NAS sub-context exists between the UE and AMF.

2. The method according to claim 1, wherein establishing the main NAS context comprises:

establishing the $K_{AMF}$, and subsequently deriving, from the $K_{AMF}$, the NAS integrity and NAS encryption keys.

3. The method according to claim 1, further comprising:

receiving a subsequent registration request from the UE over a second access type; and establishing a second NAS sub-context, the second NAS sub-context comprising at least a second NAS link identification number, a second uplink packet count, and a second downlink packet count, wherein the second NAS sub-context is secured using the NAS integrity and encryption keys and the selected algorithm from the main NAS context.

4. The method according to claim 1, wherein the main NAS context is established only for the first registration request.

5. The method according to claim 1, further comprising:

deactivating the first NAS sub-context upon UE deregistration from the first access type, wherein the main NAS context remains in effect upon deactivation of the first NAS sub-context.

6. The method according to claim 3, further comprising:

deactivating the second NAS sub-context upon UE deregistration from the second access type, wherein the main NAS context remains in effect upon deactivation of the second NAS sub-context.

7. The method according to claim 3, further comprising:

deactivating the second NAS sub-context upon UE deregistration from the second access type, wherein the main NAS context remains in effect upon deactivation of the second NAS sub-context;

subsequent to the deactivation of the second NAS sub-context from the second access type, deactivating the first NAS sub-context upon UE deregistration from the first access type;

determining that the UE has deregistered from a last access type; and deactivating the main NAS context.

8. The method according to claim 3, further comprising:

in an instance in which deregistration occurs over a particular access type, deactivating each sub-context upon UE deregistration from the particular access type; and deactivating the main NAS context.

9. The method according to claim 1, wherein the first access type is at least one of 3GPP access or non-3GPP access, and wherein the second access type is at least one of 3GPP access or non-3GPP access, and wherein the first access type and the second access type are different.

10. The method according to claim 1, wherein corresponding uplink packet count and downlink pack count and the access type identifier are maintained independently.

11. A computer program product for securing multiple non-access stratum (NAS) connections over a plurality of access types, the computer program product comprising at least one non-transitory computer-readable storage medium having computer-executable program code instructions stored therein, the computer-executable program code instructions comprising program code instructions for:

receiving, at an access mobility function (AMF), a first registration request from user equipment (UE) over a first access type;

establishing a main NAS context, between the UE and the AMF, comprising at least a key set identifier for identifying a key for the AMF ($K_{AMF}$), NAS integrity key ($K_{NASint}$) which is used to integrity protect NAS messages, and encryption key ($K_{NASenc}$) which is used to encrypt the NAS messages and a selected algorithm for all NAS links; and establishing a first NAS sub-context corresponding to a-the first access type, the first NAS sub-context comprising at least a first NAS link identification number, a first uplink packet count and a first downlink packet count, wherein the main NAS context exists as long as at least one NAS sub-context exists between the UE and AMF.

12. The computer program product according to claim 11, wherein the computer-executable program code instructions for establishing the main NAS context further comprise program code instructions for:

establishing the $K_{AMF}$; and subsequently deriving, from the $K_{AMF}$, the NAS integrity and NAS encryption keys.

13. The computer program product according to claim 11, wherein the computer-executable program code instructions further comprise program code instructions for:

receiving a subsequent registration request from the UE over a second access type; and establishing a second NAS sub-context, the second NAS sub-context comprising at least a second NAS link identification number, a second uplink packet count, and a second downlink packet count, wherein the second NAS sub-context is secured using the NAS integrity and encryption keys and the selected algorithm from the main NAS context.

14. The computer program product according to claim 11, wherein the main NAS context is established only for the first registration request.

15. The computer program product according to claim 11, wherein the computer-executable program code instructions further comprise program code instructions for:

deactivating the first NAS sub-context upon UE deregistration from the first access type, wherein the main NAS context remains in effect upon deactivation of the first NAS sub-context.

16. The computer program product according to claim 13, wherein the computer-executable program code instructions further comprise program code instructions for:

deactivating the second NAS sub-context upon UE deregistration from the second access type, wherein the main NAS context remains in effect upon deactivation of the second NAS sub-context.

17. The computer program product according to claim 13, wherein the computer-executable program code instructions further comprise program code instructions for:

deactivating the second NAS sub-context upon UE deregistration from the second access type, wherein the main NAS context remains in effect upon deactivation of the second NAS sub-context;

subsequent to the deactivation of the second NAS sub-context from the second access type, deactivating the first NAS sub-context upon UE deregistration from the first access type;
determining that the UE has deregistered from a last access type; and
deactivating the main NAS context.

18. The computer program product according to claim 13, wherein the computer-executable program code instructions further comprise program code instructions for:
in an instance in which deregistration occurs over a particular access type, deactivating each sub-context upon UE deregistration from the particular access type; and
deactivating the main NAS context.

19. The computer program product according to claim 11, wherein the first access type is at least one of 3GPP access or non-3GPP access, and wherein the second access type is at least one of 3GPP access or non-3GPP access, and wherein the first access type and the second access type are different.

20. The computer program product according to claim 11, wherein corresponding uplink packet count and downlink pack count and the access type identifier are maintained independently.

21. An apparatus for securing multiple non-access stratum (NAS) connections over a plurality of access types, the apparatus comprising at least one processor and at least one memory including computer program code, the at least one memory and the computer program code configured to, with the processor, cause the apparatus to at least:
receive, at an access mobility function (AMF), a first registration request from user equipment (UE) over a first access type;
establish a main NAS context, between the UE and the AMF, comprising at least a key set identifier for identifying a key for the AMF ($K_{AMF}$), NAS integrity key ($K_{NASint}$) which is used to integrity protect NAS messages, and encryption key ($K_{NASenc}$) which is used to encrypt the NAS messages and a selected algorithm for all NAS links; and
establish a first NAS sub-context corresponding to a-the first access type, the first NAS sub-context comprising at least a first NAS link identification number, a first uplink packet count, and a first downlink packet count, wherein the main NAS context exists as long as at least one NAS sub-context exists between the UE and AMF.

22. The apparatus according to claim 21, wherein the computer program code configured to cause establishment of the main NAS context further comprises program code further configured to, with the processor, cause the apparatus to:
establish the $K_{AMF}$; and
subsequently derive, from the $K_{AMF}$, the NAS integrity and NAS encryption keys.

23. The apparatus according to claim 21, wherein the at least one memory and the computer program code are further configured to, with the processor, cause the apparatus to:
receive a subsequent registration request from the UE over a second access type; and
establish a second NAS sub-context, the second NAS sub-context comprising at least a second NAS link identification number, a second uplink packet count, and a second downlink packet count,
wherein the second NAS sub-context is secured using the NAS integrity and encryption keys and the selected algorithm from the main NAS context.

24. The apparatus according to claim 21, wherein the main NAS context is established only for the first registration request.

25. The apparatus according to claim 21, wherein the at least one memory and the computer program code are further configured to, with the processor, cause the apparatus to:
deactivate the first NAS sub-context upon UE deregistration from the first access type,
wherein the main NAS context remains in effect upon deactivation of the first NAS sub-context.

26. The apparatus according to claim 23, wherein the at least one memory and the computer program code are further configured to, with the processor, cause the apparatus to:
deactivate the second NAS sub-context upon UE deregistration from the second access type,
wherein the main NAS context remains in effect upon deactivation of the second NAS sub-context.

27. The apparatus according to claim 23, wherein the at least one memory and the computer program code are further configured to, with the processor, cause the apparatus to:
deactivate the second NAS sub-context upon UE deregistration from the second access type, wherein the main NAS context remains in effect upon deactivation of the second NAS sub-context;
subsequent to the deactivation of the second NAS sub-context from the second access type,
deactivate the first NAS sub-context upon UE deregistration from the first access type;
determine that the UE has deregistered from a last access type; and
deactivate the main NAS context.

28. The apparatus according to claim 23, wherein the at least one memory and the computer program code are further configured to, with the processor, cause the apparatus to:
in an instance in which deregistration occurs over a particular access type, deactivate each sub-context upon UE deregistration from the particular access type; and
deactivate the main NAS context.

29. The apparatus according to claim 21, wherein the first access type is at least one of 3GPP access or non-3GPP access, and wherein the second access type is at least one of 3GPP access or non-3GPP access, and wherein the first access type and the second access type are different.

30. The apparatus according to claim 21, wherein corresponding uplink packet count and downlink pack count and the access type identifier are maintained independently.

31. A method comprising:
transmitting, from user equipment (UE), over a first access type, to an access mobility function (AMF), a first registration request;
causing establishment of a main NAS context, between the UE and the AMF, comprising at least a key set identifier for identifying a key for the AMF ($K_{AMF}$), NAS integrity key ($K_{NASint}$) which is used to integrity protect NAS messages, and encryption key ($K_{NASenc}$) which is used to encrypt the NAS messages and a selected algorithm for all NAS links; and
causing establishment of a first NAS sub-context corresponding to the first access type, the first NAS sub-context comprising at least a first NAS link identification number, a first uplink (UL) packet count, and a first downlink (DL) packet count, wherein the main NAS context exists as long as at least one NAS sub-context exists between the UE and AMF.

32. The method of claim 31, further comprising:
transmitting a subsequent registration request from the UE over a second access type; and
causing establishment of a second NAS sub-context, the second NAS sub-context comprising at least a second NAS link identification number, a second uplink packet count, and a second downlink packet count,
wherein the second NAS sub-context is secured using the NAS integrity and encryption keys and the selected algorithm from the main NAS context.

33. The method of claim 31, further comprising:
deregistering from the first access type, causing deactivation of the first NAS sub-context,
wherein the main NAS context remains in effect upon deactivation of the first NAS sub-context.

34. The method of claim 32, further comprising:
deregistering from the second access type, causing deactivation of the second NAS sub-context,
wherein the main NAS context remains in effect upon deactivation of the second NAS sub-context;
subsequent to the deactivation of the second NAS sub-context from the second access type,
deregistering from the first access type, causing deactivation of the first NAS sub-context; and
causing deactivation of the main NAS context.

35. An apparatus comprising at least one processor and at least one memory including computer program code, the at least one memory and the computer program code configured to, with the processor, cause the apparatus to at least:
transmit, from user equipment (UE), over a first access type, to an access mobility function (AMF), a first registration request;
causing establishment of a main NAS context, between the UE and the AMF, comprising at least a key set identifier for identifying a key for the AMF ($K_{AMF}$), NAS integrity key ($K_{NASint}$) which is used to integrity protect NAS messages, and encryption key ($K_{NASenc}$) which is used to encrypt the NAS messages and a selected algorithm for all NAS links; and
cause establishment of a first NAS sub-context corresponding to the first access type, the first NAS sub-context comprising at least a first NAS link identification number, a first uplink (UL) packet count, and a first downlink (DL) packet count,
wherein the main NAS context exists as long as at least one NAS sub-context exists between the UE and AMF.

36. The apparatus according to claim 35, wherein the at least one memory and the computer program code are further configured to, with the processor, cause the apparatus to:
transmit a subsequent registration request from the UE over a second access type; and
cause establishment of a second NAS sub-context, the second NAS sub-context comprising at least a second NAS link identification number, a second uplink packet count, and a second downlink packet count,
wherein the second NAS sub-context is secured using the NAS integrity and encryption keys and the selected algorithm from the main NAS context.

37. The apparatus according to claim 35, wherein the at least one memory and the computer program code are further configured to, with the processor, cause the apparatus to:
deregister from the first access type, causing deactivation of the first NAS sub-context,
wherein the main NAS context remains in effect upon deactivation of the first NAS sub-context.

38. The apparatus according to claim 36, further comprising: wherein the at least one memory and the computer program code are further configured to, with the processor, cause the apparatus to:
deregister from the second access type, causing deactivation of the second NAS sub-context,
wherein the main NAS context remains in effect upon deactivation of the second NAS sub-context;
subsequent to the deactivation of the second NAS sub-context from the second access type,
deregister from the first access type, causing deactivation of the first NAS sub-context; and
cause deactivation of the main NAS context.

* * * * *